(12) United States Patent
Liu et al.

(10) Patent No.: US 11,809,505 B2
(45) Date of Patent: Nov. 7, 2023

(54) METHOD FOR PUSHING INFORMATION, ELECTRONIC DEVICE

(71) Applicant: BEIJING BAIDU NETCOM SCIENCE TECHNOLOGY CO., LTD., Beijing (CN)

(72) Inventors: Xihuan Liu, Beijing (CN); Shichen Shao, Beijing (CN); Yongheng Li, Beijing (CN); Mengze Li, Beijing (CN); Shan Chen, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/824,595

(22) Filed: May 25, 2022

(65) Prior Publication Data
US 2022/0284067 A1 Sep. 8, 2022

(30) Foreign Application Priority Data
May 28, 2021 (CN) .......................... 202110593537.3

(51) Int. Cl.
G06F 7/02 (2006.01)
G06F 16/00 (2019.01)
G06F 16/9535 (2019.01)
G06F 16/958 (2019.01)
G06F 16/955 (2019.01)
G06F 16/9538 (2019.01)

(52) U.S. Cl.
CPC ........ *G06F 16/9535* (2019.01); *G06F 16/958* (2019.01); *G06F 16/9538* (2019.01); *G06F 16/9558* (2019.01)

(58) Field of Classification Search
CPC .............. G06F 16/9535; G06F 16/958; G06F 16/9558; G06F 16/9538
See application file for complete search history.

(56) References Cited

U.S. PATENT DOCUMENTS

| 8,533,044 | B2* | 9/2013 | Oren ....................... | G06Q 30/02 |
| | | | | 705/14.42 |
| 2007/0244755 | A1* | 10/2007 | Do ....................... | G06Q 30/0256 |
| | | | | 705/14.54 |
| 2013/0246184 | A1* | 9/2013 | Flood ..................... | G06Q 30/02 |
| | | | | 705/14.66 |

FOREIGN PATENT DOCUMENTS

CN 113297463 A * 8/2021

* cited by examiner

*Primary Examiner* — Bruce M Moser
(74) *Attorney, Agent, or Firm* — Lippes Mathias LLP

(57) ABSTRACT

A method for pushing information, and an electronic device are disclosed. The method includes: obtaining a plurality of initial pages containing document content; predicting, based on the document content in the plurality of initial pages, an effective rate for pushing information using each initial page; selecting, based on the effective rate, at least one candidate page from the plurality of initial pages and extracting a first keyword from the document content of the at least one candidate page; and determining a target page for mounting information to be pushed from the at least one candidate page, based on a matching degree between a second keyword of the information to be pushed and the first keyword.

20 Claims, 6 Drawing Sheets

METHOD FOR PUSHING INFORMATION, ELECTRONIC DEVICE

CROSS REFERENCE TO RELATED APPLICATIONS

This application is based on and claims priority to Chinese patent application Serial No. 202110593537.3 filed on May 28, 2021, the entire contents of which are incorporated herein by reference.

TECHNICAL FIELD

The disclosure relates to Artificial Intelligence (AI) fields such as deep learning, natural language processing and intelligent searching, and in particular relates to a method for pushing information, and an electronic device.

BACKGROUND

With accumulation of capacity of a library, more and more customers with commercial promotion needs (i.e., commercial customers) recognize the content marketing capability of the library, and wish to obtain high-quality traffic in the library and improve a conversion efficiency of advertising budget.

SUMMARY

Embodiments of the disclosure provide a method for pushing information, an apparatus for pushing information, an electronic device and a storage medium.

According to a first aspect, the disclosure provides a method for pushing information. The method includes: obtaining a plurality of initial pages containing document content; predicting, based on the document content in the plurality of initial pages, an effective rate for pushing information using each initial page; selecting, based on the effective rate, at least one candidate page from the plurality of initial pages and extracting a first keyword from the document content of each candidate page; and determining a target page for mounting information to be pushed from the at least one candidate page, based on a matching degree between a second keyword of the information to be pushed and the first keyword.

According to a second aspect, the disclosure provides a method for pushing information. The method includes: sending a search request including a search keyword to a server; receiving request response information, wherein the request response information includes a search result corresponding to the search keyword, the search result includes a link to a target page, and the target page is obtained according to the method of the first aspect; displaying the search result; and obtaining and displaying the target page in response to a triggering operation of the link to the target page in the search result.

According to a third aspect, the disclosure provides an electronic device. The electronic device includes: at least one processor and a memory communicatively connected to the at least one processor. The memory stores instructions executable by the at least one processor, and when the instructions are executed by the at least one processor, the at least one processor is caused to execute the method for pushing information according to the first aspect or the method for pushing information according to the second aspect.

It should be understood that the content described in this section is not intended to identify the key or important features of the embodiments of the disclosure, nor is it intended to limit the scope of the disclosure. Additional features of the disclosure will be easily understood through the following description.

BRIEF DESCRIPTION OF THE DRAWINGS

The drawings are used to better understand the solution and do not constitute a limitation of the disclosure, in which.

DETAILED DESCRIPTION

The exemplary embodiments of the disclosure are described below in combination with the accompanying drawings, which include various details of the embodiments of the disclosure to aid in understanding, and should be considered merely exemplary. Therefore, those skilled in the art should know that various changes and modifications can be made to the embodiments described herein without departing from the scope and spirit of the disclosure. For the sake of clarity and brevity, descriptions of well-known features and structures have been omitted from the following description.

With accumulation of capacity of a library, more and more customers with commercial promotion needs (i.e., commercial customers) recognize the content marketing capability of the library, and wish to obtain high-quality traffic in the library and improve a conversion efficiency of advertising budget. Currently, for the existing commercial customers in the library, the customer writes a commercial document in the library and uploads it to a library station, and then manually mounts the marketing materials or marketing components corresponding to an advertisement on the uploaded commercial document page.

However, the above way of mounting advertisements may have the following problems.

Firstly, documents written by customers themselves are of low quality in document content and thus the document page may have a low exposure, such that the marketing materials corresponding to the advertisement may not be displayed to the users. In other words, commercial documents written by the customers may not have high-quality content, resulting in a low document page recommendation weight and a low document page display probability, which may lead to a failure to achieve the customer's ideal conversion effect.

Secondly, it is impossible to automatically determine whether the content or format of the document is suitable for mounting the marketing component corresponding to the advertisement, and there is no effect evaluation and optimization process, so that the customers cannot optimize the marketing material corresponding to the advertisement as desired.

Therefore, in order to solve the above problems, the disclosure provides a method for pushing information, an apparatus for pushing information, an electronic device and a storage medium.

The method for pushing information, the apparatus for pushing information, the electronic device and the storage medium of the embodiments of the disclosure are described below with reference to the accompanying drawings.

Figure 1:
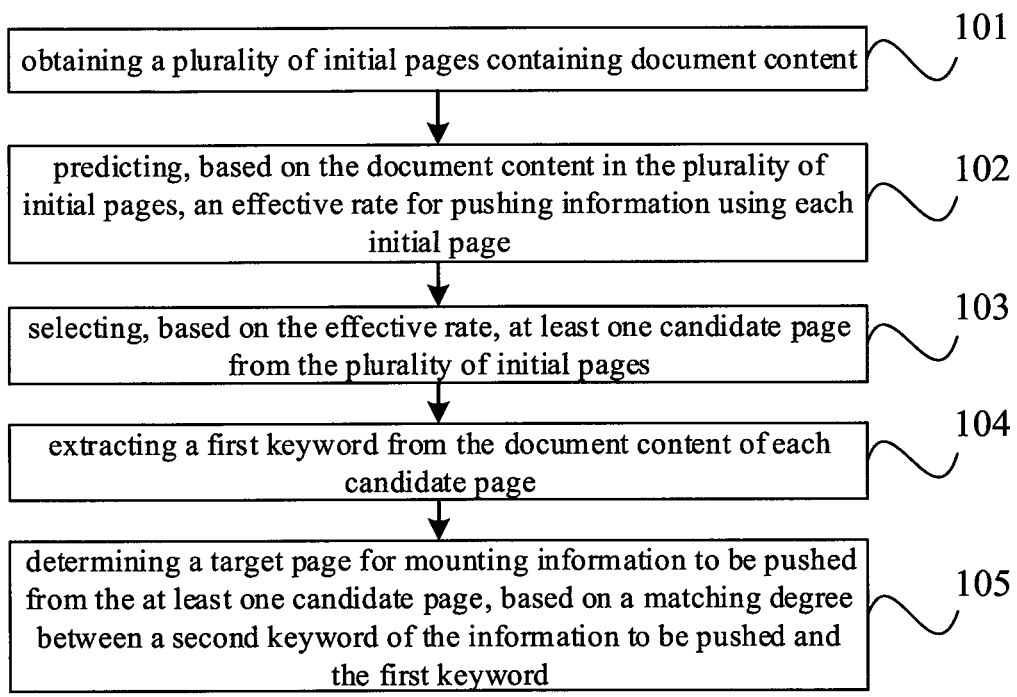
FIG. 1 is a flowchart of a method for pushing information according to Embodiment 1 of the disclosure.

FIG. 1 is a flowchart of a method for pushing information according to Embodiment 1 of the disclosure.

The method for pushing information of the embodiments of the disclosure can be applied to the server.

As shown in FIG. 1, the method for pushing information may include the following steps.

At block 101, a plurality of initial pages containing document content are obtained.

In the embodiments of the disclosure, a server can screen stored page resources, and obtain the plurality of initial pages which display the document content.

In a possible implementation of the embodiments of the disclosure, a preset type of document content can be displayed on the plurality of initial pages. The preset type can be set according to a specific type of information to be pushed and application requirements. For example, the information to be pushed is an advertisement, the preset type can be a non-commercial type. Therefore, the advertisement is mounted on the non-commercial page, to avoid harming interests of the commercial customers.

At block 102, based on the document content in the plurality of initial pages, an effective rate for pushing information using each initial page is predicted.

In the embodiments of the disclosure, the effective rate is used to represent an ability value of attracting the user to browse or visit the initial page. For example, the effective rate can be used to represent at least one of a probability that the user visits the initial page, a time length of the user visiting the initial page, and a probability that the user clicks on push information in the initial page.

In the embodiments of the disclosure, based on the document content in the plurality of initial pages, the effective rate for pushing information using each initial page is predicted.

At block 103, based on the effective rate, at least one candidate page is selected from the plurality of initial pages.

In the embodiments of the disclosure, the at least one candidate page is selected from the plurality of initial pages according to the effective rate of each initial page. As a result, the plurality of initial pages are screened according to the effective rate which represents the ability value of attracting the user to browse or visit each initial page to obtain the candidate page, the exposure of subsequent target pages can be increased, thereby increasing an exposure rate of the information to be pushed.

It should be understood that when the effective rate is high, it indicates that the initial page is more attractive to the user to browse or visit, so that when the initial page is used for pushing information, a probability that the push information is viewed by the user is high.

Therefore, in a possible implementation of the embodiments of the disclosure, in order to increase the exposure rate of the information to be pushed, the effective rates can be sorted in an ascending order. The initial pages corresponding to a preset number of effective rates ranked in the front in the sorted result are used as candidate pages.

In a possible implementation of the embodiments of the disclosure, the initial page whose effective rate is greater than a preset threshold (i.e., the first threshold in the disclosure) may be determined as the candidate page, to increase a click rate of subsequent target pages, thereby increasing the exposure rate of the information to be pushed.

At block 104, a first keyword is extracted from the document content of each candidate page.

In the embodiments of the disclosure, for each candidate page, a keyword may be extracted from the document content of the candidate page, and the keyword is used as the first keyword corresponding to the candidate page.

At block 105, a target page for mounting information to be pushed is determined from the at least one candidate page, based on a matching degree between a second keyword of the information to be pushed and the first keyword of each candidate page.

In the embodiments of the disclosure, the information to be pushed may be information that needs to be pushed, for example, information such as advertisements.

In the embodiments of the disclosure, the information to be pushed may be any push information stored on the server, or the information to be pushed may also be push information uploaded by the users. For example, taking the information to be pushed being an advertisement as an example, the advertiser may upload the marketing materials corresponding to the advertisement to the server.

In a possible implementation of the embodiments of the disclosure, the second keyword of the information to be pushed may be a keyword set by the user. For example, taking the information to be pushed being an advertisement as an example, the second keyword of the information to be pushed may be a keyword set by the advertiser for the advertisement.

There is a mapping relationship between the information to be pushed and the second keyword, so in the disclosure, the server can query the mapping relationship according to the information to be pushed, to determine the second keyword corresponding to the information to be pushed.

In a possible implementation of the embodiments of the disclosure, keyword extraction can be performed on the information to be pushed, to determine the second keyword corresponding to the information to be pushed.

In the embodiments of the disclosure, the second keyword of the information to be pushed is matched with the first keyword corresponding to each candidate page, to obtain the matching degree between the second keyword and the first keyword of each candidate page.

In a possible implementation of the embodiments of the disclosure, for each candidate page, a similarity between the second keyword of the information to be pushed and the first keyword of the candidate page can be calculated based on a similarity calculation algorithm, and the similarity is regarded as the matching degree between the second keyword and the first keyword of the candidate page.

In the embodiments of the disclosure, after determining the matching degree between the second keyword and the first keyword of each candidate page, the target page for mounting information to be pushed is selected from the at least one candidate page according to the matching degree.

In a possible implementation of the embodiments of the disclosure, the candidate page corresponding to the highest matching degree can be used as the target page for mounting the information to be pushed. In this way, the content displayed on the target page can match the information to be pushed, so that the information to be pushed can be mounted in a targeted manner.

In a possible implementation of the embodiments of the disclosure, the candidate page whose matching degree is higher than a preset threshold (i.e., the second threshold in the disclosure) can be used as the target page for mounting the information to be pushed. In this way, the document content displayed on the target page can match the information to be pushed, so that the information to be pushed can be mounted in a targeted manner. It should be understood that there may be at least one candidate page with the matching degree greater than the second threshold, so the above method can also mount the same information to be pushed on a plurality of pages, which can increase the exposure rate of the information to be pushed.

For example, taking the information to be pushed being an advertisement as an example, the keyword corresponding to the advertisement can be matched with the keyword corresponding to each candidate page stored on the server, and the marketing material or marketing component corresponding to the advertisement can be mounted on the candidate page whose matching degree is greater than the second threshold. On one hand, the advertisers do not need to manually write commercial documents to mount the marketing materials or marketing components corresponding to the advertisement, workload of the advertisers can be reduced and service experience of the advertisers can be improved. On the other hand, the keyword corresponding to the target page for mounting the advertisement matches the keyword corresponding to the advertisement, so that the advertisement can be mounted in a targeted manner, the document displayed on the target page for mounting the advertisement is consistent with a promotion need of the advertiser. Thus, it can be avoided that the content displayed on the target page does not match the advertisement, which causes the target page to have a low exposure, and in turn leads to a situation that the marketing materials corresponding to the advertisement cannot be displayed to the user. Furthermore, when there are a plurality of candidate pages each with the matching degree greater than the second threshold, the marketing materials corresponding to the same advertisement can be mounted on the plurality of pages, which can increase the exposure of the marketing materials corresponding to the advertisement, and further can improve the conversion efficiency of advertising budget.

According to the method for pushing information of the embodiment of the disclosure, the effective rate of using each initial page for pushing information is predicted based on the document content in each initial page. Based on the effective rate, at least one candidate page is selected from the plurality of initial pages, and the first keyword is extracted from the document content of each candidate page, so that the target page for mounting the information to be pushed is determined from the at least one candidate page according to the matching degree between the second keyword of the information to be pushed and the first keyword of each candidate page. Thus, on one hand, the document content displayed on the target page can match the information to be pushed, so that the information to be pushed can be mounted in a targeted manner. On the other hand, since the user does not need to manually write a document page to mount the information to be pushed, the user's workload can be reduced and the user's service experience can be improved. On the other hand, the effective rate of pushing information using each page is predicted, so as to obtain the page for mounting the information to be pushed by screening the pages based on the effective rate, which can increase the exposure rate of the information to be pushed.

In a possible implementation of the embodiments of the disclosure, the effective rate of using each initial page for pushing information can be predicted based on the deep learning technology. For example, for each initial page, feature information of the document content in the initial page can be extracted, and the feature information can be input to a trained recognition model, the effective rate corresponding to the initial page is output by the trained recognition model. In the following, in combination with Embodiment 2, the above process will be explained.

Figure 2:
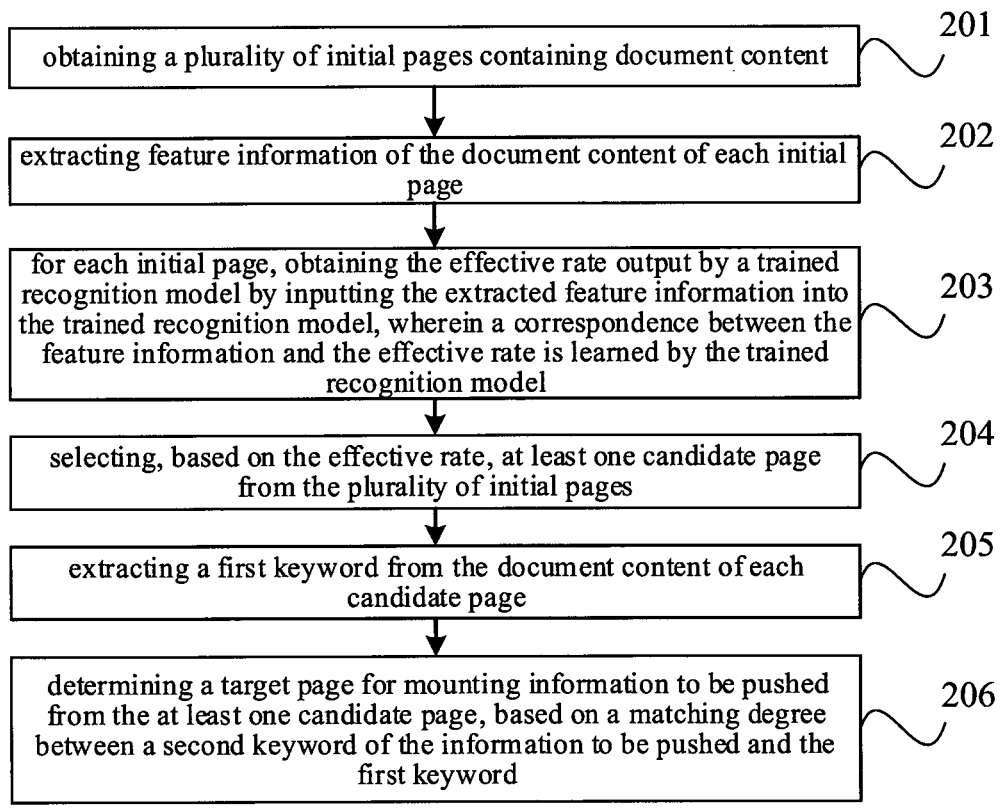
FIG. 2 is a flowchart of a method for pushing information according to Embodiment 2 of the disclosure.

FIG. 2 is a flowchart of a method for pushing information according to Embodiment 2 of the disclosure.

As shown in FIG. 2, the method for pushing information may include the following steps.

At block 201, a plurality of initial pages containing document content are obtained.

Regarding the execution process of block 201, reference can be made to the execution process of block 101 in the above embodiment, which is not repeated here.

At block 202, feature information of the document content in each initial page is extracted.

In the embodiments of the disclosure, in order to ensure the richness of extracted document features, the feature information may include at least one of a title, a category, a tag, an abstract and a keyword of the document content.

In the embodiments of the disclosure, feature extraction can be performed on the document content in each initial page based on a feature extraction algorithm to obtain the feature information of each initial page.

At block 203, for each initial page, the effective rate output by a trained recognition model is obtained by inputting the extracted feature information into the trained recognition model. A correspondence between the feature information and the effective rate is learned by the trained recognition model.

In the embodiments of the disclosure, for each initial page, the feature information of the initial page can be input to the trained recognition model, and the trained recognition model outputs the effective rate for pushing information using the initial page. The correspondence between the feature information and the effective rate is learned by the trained recognition model.

For example, the recognition model can be $F(X)=f(t, c, l, a, k)$, where t represents a title of the document content displayed on the page (referred to as document title for short), the document title can be determined when the user uploads the document; c represents a document category, that is, a content classification of the document which can be automatically calculated by a classification algorithm, for example, an existing classification algorithm can be directly introduced into the recognition model to calculate the document category; l represents a document tag set by the user when uploading the document, or the document tag can also be automatically generated, for example, the document tag can be calculated according to a tag generation algorithm; a represents a document abstract which can be automatically extracted using a content extraction algorithm in the natural language processing technology; k represents a document keyword which can be automatically extracted by the recognition model, or can also be extracted using an existing semantic analysis algorithm; and $F(X)$ output by the recognition model is the effective rate.

At block 204, based on the effective rate, at least one candidate page is selected from the plurality of initial pages.

Further, after the candidate pages are obtained through screening, the plurality of candidate pages may also be stored in a document pool.

At block 205, a first keyword is extracted from the document content of each candidate page.

In any example embodiment of the disclosure, based on the semantic analysis algorithm in the natural language processing (NLP) technology, keyword extraction may be performed on the document content of each candidate page, to obtain the first keyword corresponding to each candidate page.

In any example embodiment of the disclosure, in order to improve an accuracy of the keyword extraction result, the keyword in the document content of the candidate page may be extracted based on the deep learning technology, to obtain the first keyword of the candidate page. For example, the recognition model can be used to extract the keyword from the document content of each candidate page, to obtain the first keyword corresponding to each candidate page.

For example, the semantic analysis algorithm can be introduced into the recognition model. Through the semantic analysis algorithm, the keyword in the document content of the candidate page can be extracted, to obtain the first keyword corresponding to the candidate page.

In any example embodiment of the disclosure, when screening the plurality of initial pages using the recognition model, the recognition model can extract the keyword in the document content of each initial page, that is, the recognition model is used to extract the keyword from the document content of each initial page, to obtain the keyword corresponding to each initial page. In the disclosure, in order to improve processing efficiency, a correspondence between a page identifier of each initial page and the keyword of the document content in each initial page is saved. Therefore, after the candidate pages are obtained by screening, for each candidate page, the correspondence can be queried according to a target page identifier of the candidate page, to determine the keyword corresponding to the target page identifier, and the keyword corresponding to the target page identifier is determined as the second keyword of the candidate page.

At block 206, a target page for mounting information to be pushed is determined from the at least one candidate page, based on a matching degree between a second keyword of the information to be pushed and the first keyword.

In any example embodiment of the disclosure, semantic analysis can be performed on the information to be pushed based on the semantic analysis algorithm, to extract the second keyword of the information to be pushed.

In any example embodiment of the disclosure, a keyword tag of the information to be pushed is obtained, where the keyword tag is configured in response to a user action, and the second keyword of the information to be pushed is determined based on the keyword tag. Therefore, the user can set the keyword corresponding to the information to be pushed according to his own needs, which not only improves flexibility and applicability of the method, but also meets individual needs of different users.

For example, the information to be pushed is used as an advertisement. When an advertiser uploads the advertisement through a client, the keyword corresponding to the advertisement can be set, and the client can set the keyword tag corresponding to the advertisement in response to a user action, and sends the advertisement and the keyword tag corresponding to the advertisement to the server. Therefore, the server can determine the keyword corresponding to the advertisement according to the keyword tag sent by the client.

In any example embodiment of the disclosure, the server can also query the correspondence between push information and keywords according to the information to be pushed to determine target push information that matches the information to be pushed, and determine the keyword corresponding to the target push information as the second keyword of the information to be pushed.

For example, when the server stores the keyword corresponding to the information to be pushed, the keyword corresponding to the information to be pushed can be directly determined by querying, without re-extracting the keyword of the information to be pushed, which can reduce processing burden of the server.

For example, taking the information to be pushed being an advertisement as an example, when the advertiser uploads the advertisement through the client, the keyword corresponding to the advertisement can be set, and the client can send the advertisement and the keyword corresponding to the advertisement to the server for storage. Therefore, the server can query the correspondence between the advertisement and the keyword according to the advertisement to be pushed, determine a target advertisement corresponding to the advertisement to be pushed, and determine the keyword corresponding to the target advertisement as the second keyword of the advertisement to be pushed.

For another example, when the server does not store the keyword corresponding to the information to be pushed, the information to be pushed can be matched with the push information in the above correspondence, the push information with the highest matching degree is determined as the target push information, and the keyword corresponding to the target push information can be determined as the second keyword of the information to be pushed.

For example, taking the information to be pushed being an advertisement as an example, even if the server does not store the keyword corresponding to the advertisement to be pushed, an advertisement similar to the advertisement to be pushed can be determined by matching, and the keyword corresponding to the similar advertisement is determined as the keyword corresponding to the advertisement to be pushed.

For the execution process of blocks 204 to 206, reference can be made to the execution process of the foregoing embodiments, which will not be repeated here.

According to the method for pushing information, the feature information of the document content of each initial page is extracted. For each initial page, the effective rate output by the recognition model is obtained by inputting the extracted feature information into the recognition model, and the correspondence between the feature information and the effective rate is learned by the recognition model. Therefore, the effective rate of using each initial page for pushing information is predicted based on the deep learning technology, the accuracy of the prediction result may be improved.

In a possible implementation of the embodiments of the disclosure, a visit record of each page can be obtained, and the effective rate of each page can be determined based on the visit record of each page. The feature information and the effective rate corresponding to each page can be used to train the recognition model, so that the correspondence between the feature information and the effective rate is learned by the trained recognition model. The above process will be described in detail below in combination with the Embodiment 3.

Figure 3:
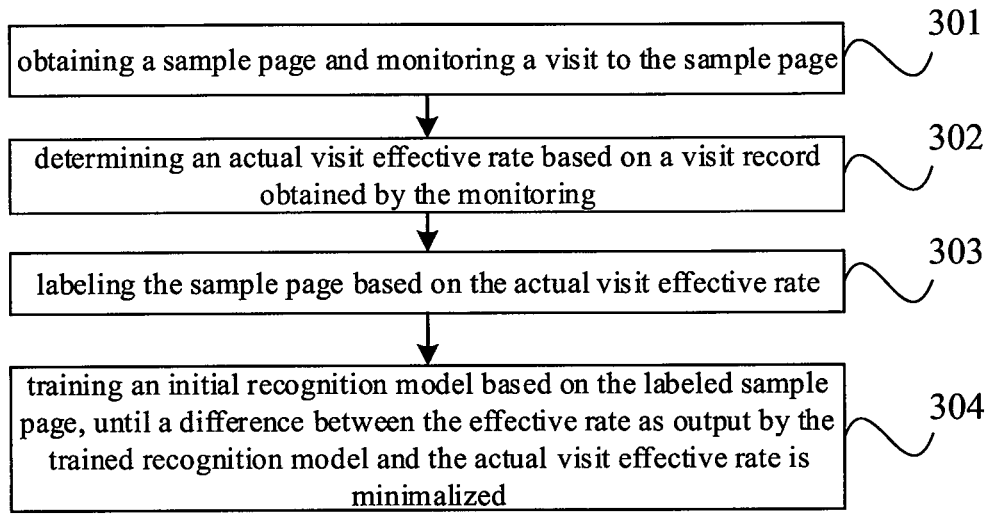
FIG. 3 is a flowchart of a training method of a model for pushing information according to Embodiment 3 of the disclosure.

FIG. 3 is a flowchart of a training method of a model for pushing information according to Embodiment 3 of the disclosure.

As shown in FIG. 3, the recognition model can be obtained by training in the following steps.

At block 301, a sample page is obtained and a visit to the sample page is monitored.

In the embodiments of the disclosure, the sample page can be any page resource stored on the server, or the sample page can also be a page resource mounted with the push information stored on the server, or the sample page can also be a page resource that contains document content stored on the server, which are not limited in the disclosure.

In the embodiments of the disclosure, the server can obtain the sample page, and monitor the visit to the sample page.

At block 302, an actual visit effective rate is determined based on a visit record obtained by the monitoring.

In the embodiments of the disclosure, based on the monitored visit record, the server can determine visit information corresponding to the sample page, such as the number of visits to the sample page, a duration of a single visit, a total visit duration, and a number of clicks of the push information mounted on the sample page, so that the actual visit effective rate can be determined according to the visit information. The actual visit effective rate has a positive relationship with the visit information such as the number of visits to the sample page, the duration of a single visit, the total visit duration, and the number of clicks of the push information mounted on the sample page.

At block 303, the sample page is labeled based on the actual visit effective rate.

At block 304, an initial recognition model is trained based on the labeled sample page, so that a difference between the effective rate as output by the trained recognition model and the actual visit effective rate is minimized.

In the embodiments of the disclosure, the sample page is labeled according to the actual visit effective rate, and the labeled sample page is used to train the initial recognition model, so that the difference between the effective rate as output by the trained recognition model and the actual visit effective rate is minimalized. That is, the feature information of the sample page is used as an input of the recognition model, and it is determined whether the difference between the effective rate as output by the recognition model and the actual visit effective rate labeled in the sample page is minimalized. If so, the training process can be ended, if not, model parameters of the recognition model are adjusted and the recognition model is continued to be trained, to minimize the difference between the effective rate as output by the recognition model and the actual visit effective rate labeled in the sample page is minimalized.

According to the training method of a model for pushing information in the embodiments of the disclosure, the recognition model is trained to minimize the difference between the effective rate as output by the recognition model and the actual visit effective rate labeled on the sample page. In this way, the trained recognition model is used to predict the effective rate for pushing information using the initial page, which may improve the accuracy of the prediction result.

In a possible implementation of the embodiments of the disclosure, the first threshold may be adjusted to update the page for mounting the information to be pushed, thereby improving a promotion effect of the information to be pushed. The above process will be described in detail below in combination with Embodiment 4.

Figure 4:
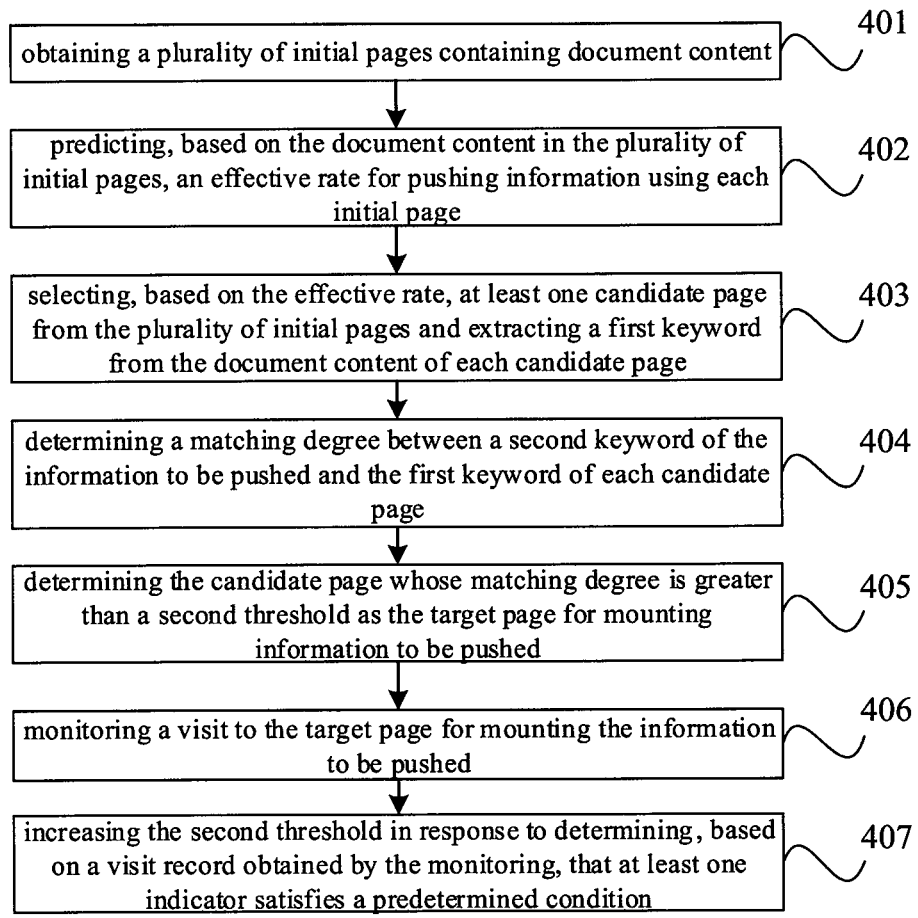
FIG. 4 is a flowchart of a method for pushing information according to Embodiment 4 of the disclosure.

FIG. 4 is a flowchart of a method for pushing information according to Embodiment 4 of the disclosure.

As shown in FIG. 4, the method for pushing information may include the following steps.

At block 401, a plurality of initial pages containing document content are obtained.

At block 402, based on the document content in the plurality of initial pages, an effective rate for pushing information using each initial page is predicted.

At block 403, based on the effective rate, at least one candidate page is selected from the plurality of initial pages and a first keyword is extracted from the document content of each candidate page.

At block 404, a matching degree between a second keyword of information to be pushed and the first keyword of each candidate page is determined.

At block 405, the candidate page whose matching degree is greater than a second threshold is determined as the target page for mounting the information to be pushed.

For the execution process of blocks 401 to 405, reference may be made to the execution process of any of the foregoing embodiments, and details are not described herein.

At block 406, a visit to the target page for mounting the information to be pushed is monitored.

At block 407, the second threshold is increased in response to determining, based on a visit record obtained by the monitoring, that at least one indicator satisfies a predetermined condition.

In the embodiments of the disclosure, indicators may include visit indicators such as the number of visits to the target page, a duration of a single visit, a total visit duration, and the number of clicks of the information to be pushed.

In the embodiments of the disclosure, the server can monitor the visit to the target page where the information to be pushed is mounted, determine a plurality of indicators based on the monitored visit record, and determine whether each indicator meets the corresponding preset condition. When at least one of the plurality of indicators meets the corresponding preset condition, the second threshold may be increased. In this way, the second threshold can be dynamically adjusted, so that the page on which the information to be pushed is mounted can be dynamically adjusted, which may improve a promotion effect of the information to be pushed.

For example, taking the indicator being the number of visits to the target page as an example, the preset condition corresponding to the number of visits may be that the number is less than a first number. When the number of visits to the target page is less than the first number, it can be determined that the preset condition is satisfied.

Taking the indicator being the duration of a single visit of the target page as an example, the preset condition corresponding to the duration of a single visit may be that the duration is less than a preset duration. When the duration of a single visit of the target page is less than the preset duration, it can be determined that the preset condition is satisfied.

Taking the indicator being the total visit duration of the target page as an example, the preset condition corresponding to the total visit duration may be that the duration is less than a preset total duration. When the total visit duration of the target page is less than the preset total duration, it can be determined that the preset condition is satisfied.

Taking the indicator being the number of clicks of the information to be pushed as an example, the preset condition corresponding to the number of clicks may be that the number is less than a preset second number. When the number of clicks of the information to be pushed in the target page is less than the second number, it can be determined that the preset condition is satisfied.

For example, taking the information to be pushed being an advertisement as an example, when the marketing material of the advertisement is mounted on 10 pages, and one page of the 10 pages is hardly visited, the threshold can be increased in this case, to reduce the number of pages on which the advertisement is mounted.

According to the method for pushing information, the visit to the target page for mounting the information to be pushed is monitored. The second threshold is increased in response to determining, based on the visit record obtained by the monitoring, that at least one indicator satisfies the predetermined condition. In this way, by dynamically adjusting the second threshold, it is possible to dynamically update the page where the information to be pushed is mounted, thereby improving a promotion effect of the information to be pushed.

In any example embodiment of the disclosure, in order to further improve the promotion effect of the information to be pushed, in the case where it is determined that at least one indicator meets the preset condition according to the monitored visit record of the target page where the information to be pushed is mounted, the first threshold can also be increased. In this way, the candidate page can be dynamically updated, and the page on which the information to be pushed is mounted can be updated, such that the promotion effect of the information to be pushed can be further improved.

The foregoing embodiments are various method embodiments executed by the server, and embodiments of the disclosure also provide a method for pushing information executed by a client.

Figure 5:
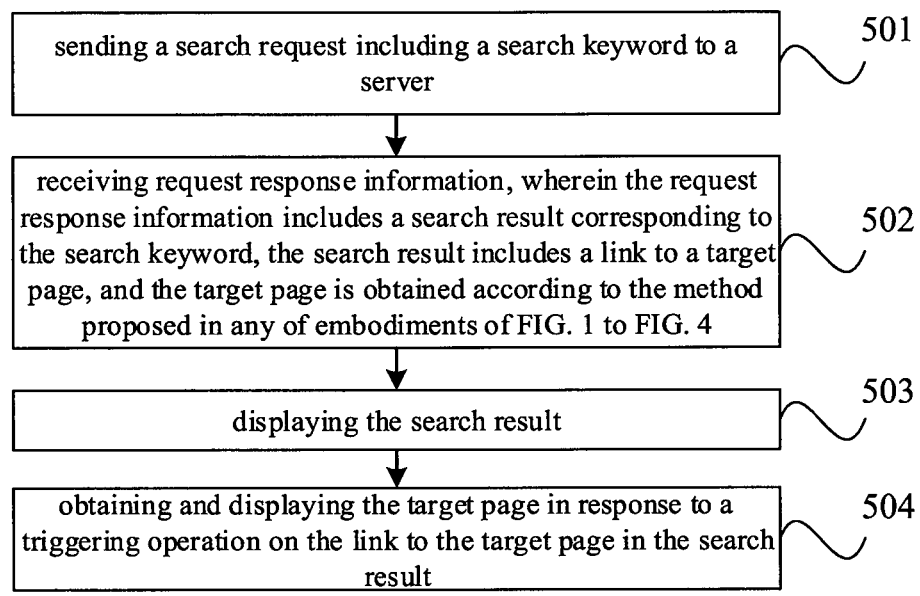
FIG. 5 is a flowchart of a method for pushing information according to Embodiment 5 of the disclosure.

FIG. 5 is a flowchart of a method for pushing information according to Embodiment 5 of the disclosure.

The method for pushing information of the embodiments of the disclosure can be applied to the client.

As shown in FIG. 5, the method for pushing information may include the following steps.

At block 501, a search request including a search keyword is sent to a server.

In the embodiment of the disclosure, an input method of the search keyword may include, but is not limited to, touch input (such as sliding and clicking), keyboard input and voice input.

In the embodiment of the disclosure, after receiving the search keyword input by the user, the client may send the search request to the server. The search request may include the search keyword.

At block 502, request response information is received, the request response information includes a search result corresponding to the search keyword, the search result includes a link to a target page, and the target page is obtained according to the method of any embodiment of FIG. 1 to FIG. 4.

In the embodiment of the disclosure, after receiving the search request sent by the client, the server can query the page corresponding to the search keyword according to the search keyword, and return the request response information to the client. The request response information may include the search result corresponding to the search keyword. The search result may include the link to the page corresponding to the search keyword, such as the link to the target page. The target page may be obtained by the method proposed according to any one of the embodiments in FIGS. 1 to 4.

At block 503, the search result is displayed.

At block 504, the target page is obtained and displayed in response to a triggering operation on the link to the target page in the search result.

In the embodiments of the disclosure, after displaying the search result, the client can obtain the target page from the server and display the target page in response to monitoring a triggering operation on the target page in the search result. In this way, the information to be pushed can be displayed in the target page, that is, the information to be pushed can be pushed to the user.

According to the method for pushing information, the search request including the search keyword is sent to the server. The request response information is received, the request response information includes the search result corresponding to the search keyword, the search result includes the link to the target page, and the target page is obtained according to the method of any one of embodiments described with reference to FIG. 1 to FIG. 4. The search result is displayed, and the target page is obtained and displayed in response to the triggering operation on the link to the target page in the search result. Therefore, the information to be pushed can be displayed in the target page, that is, the information to be pushed can be pushed to the user.

For example, taking the information to be pushed being an advertisement as an example, the initial page is labeled as a document page. The disclosure can process and parse the document content in the document page based on machine learning and natural language processing technologies, and extract key information points of the document to identify whether the document page has a customer acquisition and conversion capability (determined according to the effective rate). If the document page has the customer acquisition and conversion capability (that is, the effective rate is greater than the first threshold), a matching is performed on the document page and the advertiser's promotion needs. If the document page matches the advertiser's promotion needs, the marketing component corresponding to the advertisement is mounted on the document page. In addition, it is also possible to dynamically adjust the first threshold and/or second threshold, by regularly evaluating a customer conversion effect of the marketing material corresponding to the advertisement (that is, a conversion effect of the advertising budget), to achieve an optimum effect of the marketing material corresponding to the advertisement.

Figure 6:
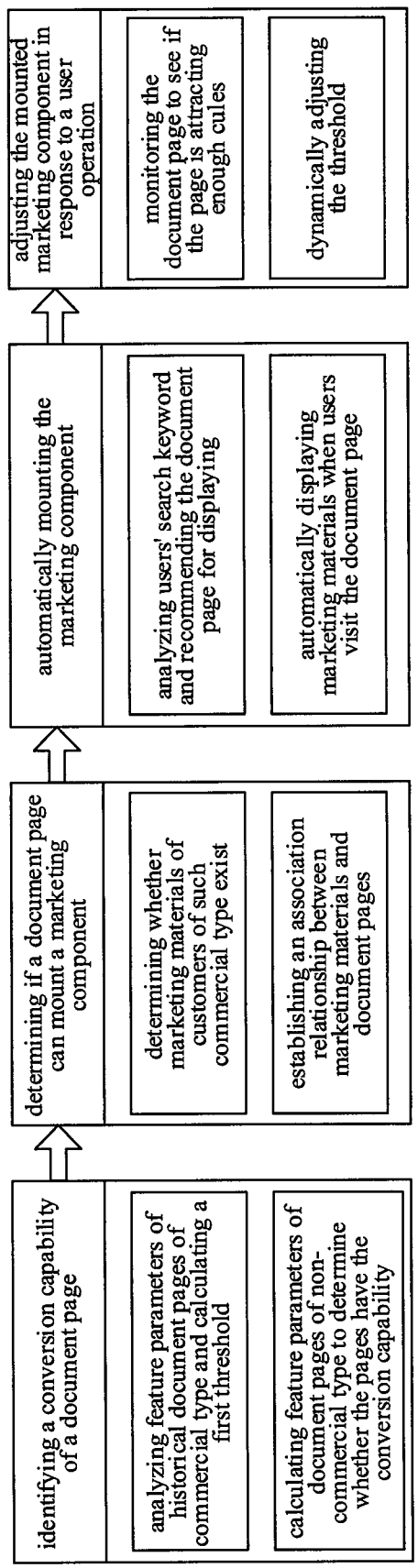
FIG. 6 is a flowchart of a method for pushing information according to Embodiment 6 of the disclosure.

As shown in FIG. 6, the method for pushing information of the disclosure can include the following steps.

The first step is to identify the conversion capability of the document page. An algorithm for analyzing the customer acquisition capability of a document can be established to automatically analyze whether the document page has a nature of commercial conversion that attracts users to leave clues or conduct online consultations, and a customer acquisition and conversion document pool (referred to as document pool in the disclosure) is established.

Firstly, a model is established to analyze the existing commercial document pages in a site, to determine a type of content classification documents uploaded by the customer and a type of keywords set by the customer, and to calculate an initial determination threshold of document page conversion capability (referred to as first threshold in the disclosure). The model is used to calculate a customer acquisition capability coefficient of other non-commercial document pages (denoted as effective rate in the disclosure). If the effective rate is greater than the first threshold, it is determined that the document page has the commercial conversion capability, and the document page is classified into the document pool.

The model is used to calculate an average conversion capability value of the stored commercial document pages, and the average conversion capability value can be set as the initial determination threshold, that is, the first threshold. The feature information of the stored non-commercial document pages can be input into the model, and if the calculation result is greater than the first threshold, then it is determined that the document page has the commercial conversion capability, and the document page can be classified into the document pool.

The second step is to determine whether the document page can be mounted with the marketing material corresponding to the advertisement. It is determined whether there is a document page in the document pool that matches the marketing material corresponding to the client's advertisement, and an association relationship between the matched document page and the marketing material corresponding to the advertisement can be established.

The keyword corresponding to the document page (i.e., document keyword) can be matched with the keyword of the advertisement set by the customer. If the matching degree between the keyword set by the customer and the document keyword is greater than the second threshold, it is determined that the marketing material corresponding to the advertisement can be mounted in the document page.

A keyword matching method can be used to establish a matching degree based two-way mapping relationship between the marketing material corresponding to the advertisement and the document page in the document pool, and the association relationship between a newly added document page and the marketing material corresponding to a new advertisement added by the customer can be regularly (such as daily) updated.

The third step is to automatically mount and display the marketing material corresponding to the advertisement. The keyword searched by the user is analyzed, the marketing material corresponding to the advertisement is dynamically displayed on the periphery of the document page, to attract the users to leave clues, to promote telephone consultations, and to improve the conversion rate of the marketing material corresponding to the advertisement.

After the association relationship is established, when the user enters the document page through the search keyword, if the document page in the document pool is displayed, the marketing material corresponding to the advertisement is automatically mounted and displayed at the periphery of the document page according to the matching degree of each advertisement and the document page, to attract the users to understand the product or service promoted by the customer and leave contact information for the customer sale for further communication, or directly conduct online consultations, so that the commercial customer can guide the users to the conduct subsequent conversion actions.

The fourth step is to dynamically adjust the model. By regularly verifying an effect of the model, the first threshold for the model to determine the conversion capability and the second threshold associated with the marketing material are continuously and dynamically adjusted, to achieve the effect of mounting the marketing material with the best conversion rate.

By regularly evaluating the user conversion effect brought by the calculation result of the model, the conversion rate of the marketing material is calculated based on the calculation result of the model and the threshold. By dynamically adjusting the first threshold and/or the second threshold, the matching degree between the marketing material and the document content or document type is improved, and the matching degree between the marketing material corresponding to the advertisement and the customer's needs is improved, thereby increasing the marketing conversion rate and guaranteeing requirements on the commercial promotion and customer acquisition of the customer.

As a result, the marketing conversion capability of the document page can be calculated in a machine automation manner, and with the goal of maximizing the conversion rate, the customer's marketing material or marketing component is automatically displayed in front of the user, which scientifically improves the customer's advertisement content marketing effect. In this way, the efficiency of using the marketing material of the advertisement is improved, manual work is reduced and the conversion efficiency of advertising budget is maximized, which brings more sale or consulting clues to the customer, and maximizes the marketing conversion capability of the advertisement.

Corresponding to the method for pushing information according to the embodiments of FIG. 1 to FIG. 4, the disclosure also provides an apparatus for pushing information, and since the apparatus for pushing information according to the embodiments of the disclosure corresponds to the method for pushing information according to the embodiments of FIG. 1 to FIG. 4, the implementation of the method for pushing information is also applicable to the apparatus for pushing information in the embodiments of the disclosure, and will not be described in detail in the embodiments of the disclosure.

Figure 7:
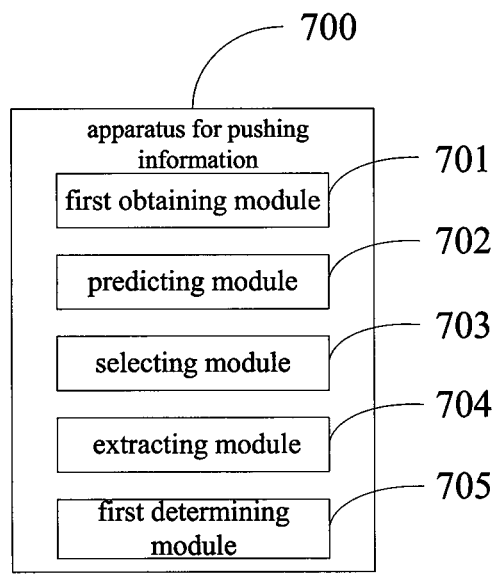
FIG. 7 is a block diagram of an apparatus for pushing information according to Embodiment 7 of the disclosure.

FIG. 7 is a block diagram of an apparatus for pushing information according to Embodiment 7 of the disclosure. The apparatus for pushing information can be applied to a server.

As shown in FIG. 7, the apparatus 700 for pushing information may include: a first obtaining module 701, a predicting module 702, a selecting module 703, an extracting module 704, and a first determining module 705.

The first obtaining module 701 is configured to obtain a plurality of initial pages containing document content.

The predicting module 702 is configured to predict, based on the document content in the plurality of initial pages, an effective rate for pushing information using each initial page.

The selecting module 703 is configured to select, based on the effective rate, at least one candidate page from the plurality of initial pages.

The extracting module 704 is configured to extract a first keyword from the document content of each candidate page.

The first determining module 705 is configured to determine a target page for mounting information to be pushed from the at least one candidate page, based on a matching degree between a second keyword of the information to be pushed and the first keyword.

In a possible implementation of the embodiments of the disclosure, the predicting module 702 is further configured to: extract feature information of the document content of each initial page; and for each initial page, obtain the effective rate output by a trained recognition model by inputting the feature information into the trained recognition model, in which a correspondence between the feature information and the effective rate is learned by the trained recognition model.

In a possible implementation of the embodiments of the disclosure, the trained recognition model is obtained by operations of the following modules including: a first monitoring module, configured to obtain a sample page and monitor a visit to the sample page; a second determining module, configured to determine an actual visit effective rate based on a visit record obtained by the monitoring; a labeling module, configured to obtain a labeled sample page by labeling the sample page based on the actual visit effective rate; and a training module, configured to train an initial recognition model based on the labeled sample page, until a difference between the effective rate as output by the trained recognition model and the actual visit effective rate is minimalized.

In a possible implementation of the embodiments of the disclosure, the selecting module 703 is further configured to: determine the initial page whose effective rate is greater than a first threshold as one candidate page.

In a possible implementation of the embodiments of the disclosure, the apparatus 700 for pushing information further includes: a second monitoring module and a first adjusting module.

The second monitoring module is configured to monitor a visit to the target page for mounting the information to be pushed.

The first adjusting module is configured to increase the first threshold in response to determining, based on a visit record obtained by the monitoring, that at least one indicator satisfies a predetermined condition.

In a possible implementation of the embodiments of the disclosure, the first determining module 705 is further configured to: determine the candidate page whose matching degree is greater than a second threshold as the target page.

In a possible implementation of the embodiments of the disclosure, the apparatus 700 for pushing information further includes: a third monitoring module and a second adjusting module.

The third monitoring module is configured to monitor a visit to the target page for mounting the information to be pushed.

The second adjusting module is configured to increase the second threshold in response to determining, based on a visit record obtained by the monitoring, that at least one indicator satisfies a predetermined condition.

In a possible implementation of the embodiments of the disclosure, the extracting module 704 is further configured to: obtain the first keyword corresponding to each candidate page by performing keyword extraction on the document content of each candidate page using the trained recognition model.

In a possible implementation of the embodiments of the disclosure, the apparatus 700 for pushing information further includes: a second obtaining module and a third determining module.

The second obtaining module is configured to obtain a keyword tag of the information to be pushed, in which the keyword tag is configured in response to a user action.

The third determining module is configured to determine the second keyword of the information to be pushed based on the keyword tag.

In a possible implementation of the embodiments of the disclosure, the apparatus 700 for pushing information further includes: a querying module and a fourth determining module.

The querying module is configured to query a correspondence between push information and keywords based on the information to be pushed, and determine target push information that matches the information to be pushed.

The fourth determining module is configured to determine a keyword corresponding to the target push information as the second keyword of the information to be pushed.

With the apparatus for pushing information according to the embodiments of the disclosure, the effective rate of pushing information using each initial page is predicted based on the document content in each initial page. At least one candidate page is selected from the initial pages based on the effective rate, and the first keyword is extracted from the document content of each candidate page. According to the matching degree between the second keyword of the information to be pushed and the first keyword of each candidate page, the target page in which the information to be pushed is mounted is determined from the at least one candidate page. Thus, on one hand, the document content displayed on the target page matches the information to be pushed, so that the information to be pushed can be mounted in a targeted manner. On the other hand, since the user does not need to manually write a document page to mount the information to be pushed, the user's workload can be reduced and the user's service experience can be improved. Furthermore, the efficiency of pushing information on each page is predicted, so as to obtain the page for mounting the information to be pushed by screening pages based on the effective rate, which can increase the exposure rate of the information to be pushed.

Corresponding to the method for pushing information according to the embodiments of FIGS. 5 to 6, the disclosure also provides an apparatus for pushing information, and since the apparatus for pushing information according to the embodiments of the disclosure corresponds to the method for pushing information according to the embodiments of FIGS. 5 to 6, the implementation of the method for pushing information is also applicable to the apparatus for pushing information according to the embodiments of the disclosure, and will not be described in detail in the embodiments of the disclosure.

Figure 8:
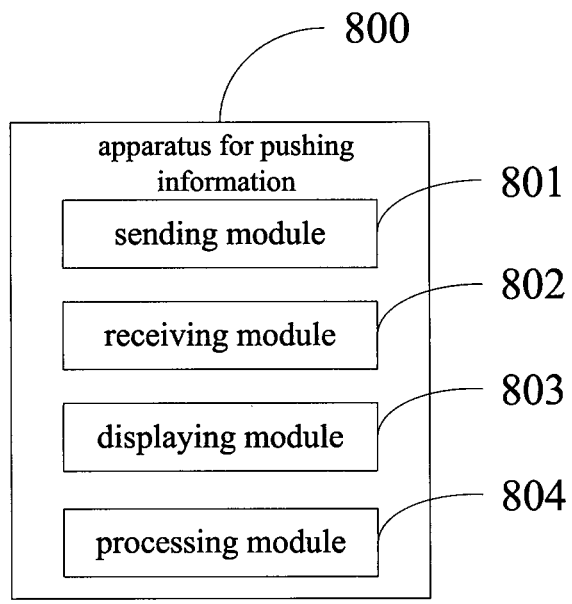
FIG. 8 is a block diagram of an apparatus for pushing information according to Embodiment 8 of the disclosure.

FIG. 8 is a block diagram of an apparatus for pushing information according to Embodiment 8 of the disclosure. The apparatus for pushing information can be applied to a client.

As shown in FIG. 8, the apparatus 800 for pushing information may include: a sending module 801, a receiving module 802, a displaying module 803 and a processing module 804.

The sending module 801 is configured to send a search request including a search keyword to a server.

The receiving module 802 is configured to receive request response information, in which the request response information includes a search result corresponding to the search keyword, the search result includes a link to a target page, and the target page is obtained according to the apparatus of FIG. 7.

The displaying module 803 is configured to display the search result.

The processing module 804 is configured to obtain and display the target page in response to a triggering operation on the link to the target page in the search result.

The apparatus for pushing information of the embodiments of the disclosure sends the search request including the search keyword to the server. The request response information is received. The request response information includes the search result corresponding to the search keyword, the search result includes the link to the target page, and the target page is obtained according to the method proposed in any one of the embodiments in FIG. 1 to FIG. 4. The search result is displayed. The target page is obtained and displayed in response to the triggering operation on the link to the target page in the search result. In this way, it is possible to display the information to be pushed in the target page, that is, to push the information to be pushed to the user.

In order to implement the above embodiments, the disclosure provides a server, which may include at least one processor, and a memory communicatively connected with the at least one processor. The memory stores instructions that can be executed by at least one processor, and the instructions are processed by the at least one processor, so that the at least one processor can execute the method for pushing information according to any one of the above-mentioned embodiments of FIG. 1 to FIG. 4 and FIG. 6 of the disclosure.

In order to implement the above embodiments, this disclosure also provides a client, which may include at least one processor and a memory communicatively connected with the at least one processor. The memory stores instructions that can be executed by the at least one processor, and the instructions are executed by the at least one processor, so that the at least one processor can execute the method for pushing information according to the foregoing embodiments of FIG. 5 to FIG. 6 of the disclosure.

In order to implement the above embodiments, the disclosure also provides a non-transitory computer-readable storage medium storing computer instructions, where the computer instructions are configured to make a computer execute the method for pushing information according to any one of the above embodiments of FIG. 1 to FIG. 4 and FIG. 6 of the disclosure.

In order to implement the above embodiments, the disclosure also provides a non-transitory computer-readable storage medium storing computer instructions, where the computer instructions are configured to make a computer execute the method for pushing information according to any one of the above embodiments of FIG. 5 to FIG. 6 of the disclosure.

In order to implement the above embodiments, the disclosure also provides a computer program product. The computer program product includes a computer program. When the computer program is executed by a processor, the method for pushing information according to any one of the above embodiments of FIG. 1 to FIG. 4 and FIG. 6 of the disclosure is executed.

In order to implement the above embodiments, the disclosure also provides a computer program product. The computer program product includes a computer program. When the computer program is executed by a processor, the method for pushing information according to any one of the above embodiments of FIG. 5 to FIG. 6 of the disclosure is executed.

According to the embodiments of the disclosure, the disclosure also provides an electronic device, a readable storage medium and a computer program product.

Figure 9:
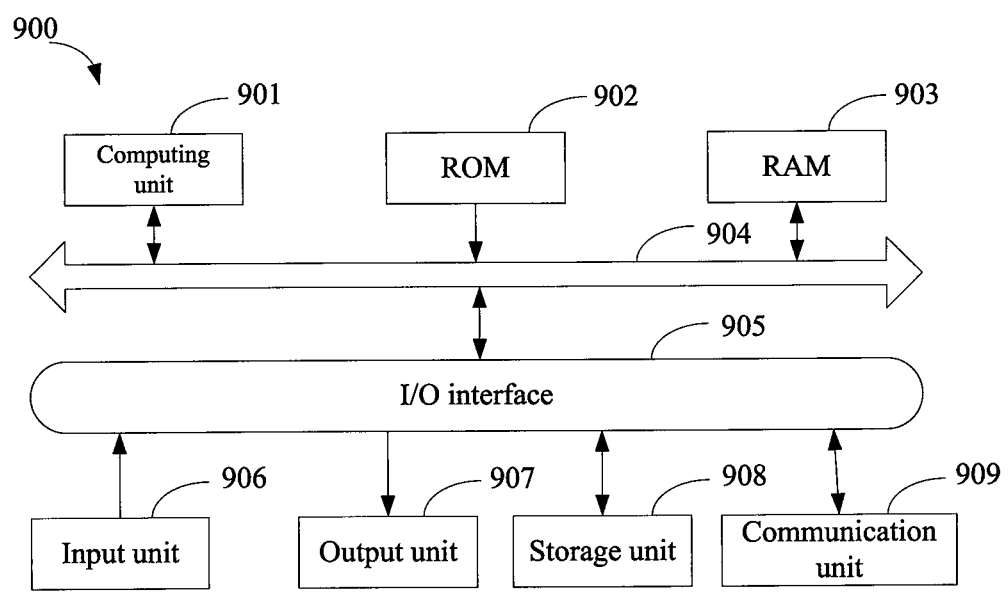
FIG. 9 is a block diagram of an electronic device configured to implement the embodiments of the disclosure.

FIG. 9 is a block diagram of an electronic device according to embodiments of the disclosure. The electronic device may include a server and a client in the above embodiments. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 9, the device 900 includes a computing unit 901 performing various appropriate actions and processes based on computer programs stored in a read-only memory (ROM) 902 or computer programs loaded from the storage unit 508 to a random access memory (RAM) 903. In the RAM 903, various programs and data required for the operation of the device 900 are stored. The computing unit 901, the ROM 902, and the RAM 903 are connected to each other through a bus 904. An input/output (I/O) interface 905 is also connected to the bus 904.

Components in the device 900 are connected to the I/O interface 905, including: an inputting unit 906, such as a keyboard, a mouse; an outputting unit 907, such as various types of displays, speakers; a storage unit 908, such as a disk, an optical disk; and a communication unit 909, such as network cards, modems, wireless communication transceivers, and the like. The communication unit 909 allows the device 900 to exchange information/data with other devices through a computer network such as the Internet and/or various telecommunication networks.

The computing unit 901 may be various general-purpose and/or dedicated processing components with processing and computing capabilities. Some examples of computing unit 901 include, but are not limited to, a central processing unit (CPU), a graphics processing unit (GPU), various dedicated artificial intelligence (AI) computing chips, various computing units that run machine learning model algorithms, and a digital signal processor (DSP), and any appropriate processor, controller and microcontroller. The computing unit 901 executes the various methods and processes described above, such as the method for pushing information. For example, in some embodiments, the method may be implemented as a computer software program, which is tangibly contained in a machine-readable medium, such as the storage unit 908. In some embodiments, part or all of the computer program may be loaded and/or installed on the device 900 via the ROM 902 and/or the communication unit 909. When the computer program is loaded on the RAM 903 and executed by the computing unit 901, one or more steps of the method described above may be executed. Alternatively, in other embodiments, the computing unit 901 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), erasable programmable read-only memories (EPROM or flash memory), fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), the Internet and Block-chain network.

The computer system may include a client and a server. The client and server are generally remote from each other and interacting through a communication network. The client-server relation is generated by computer programs running on the respective computers and having a client-server relation with each other. The server can be a cloud server, also known as a cloud computing server or a cloud host, which is a host product in the cloud computing service system, to solve the traditional physical host with a Virtual Private Server (VPS) service, which has the defects of difficult management and weak business expansibility. The server can also be a server for a distributed system, or a server that incorporates a blockchain.

It is noted that Artificial Intelligence (AI) is a discipline that studies certain thinking processes and intelligent behaviors (such as learning, reasoning, thinking and planning) that allow computers to simulate life, which has both hardware-level technologies and software-level technologies. Artificial intelligence hardware technology generally includes technologies such as sensors, dedicated artificial intelligence chips, cloud computing, distributed storage, and big data processing. Artificial intelligence software technology generally includes computer vision technology, speech recognition technology, natural language processing technology, and its learning/deep learning, big data processing technology, knowledge map technology and other aspects.

According to the technical solution of the embodiments of the disclosure, by predicting the effective rate for pushing information on each initial page based on the document content in each initial page, according to the effective rate, at least one candidate page is selected from the initial pages and the first keyword is extracted from the document content of each candidate page, and according to the matching degree between the second keyword of the information to be pushed and the first keyword of each candidate page, the target page in which the information to be pushed is mounted is determined from the at least one candidate page. Thus, on one hand, the document content displayed on the target page matches the information to be pushed, so that the information to be pushed can be mounted in a targeted manner. On the other hand, since the user does not need to manually write a document page to mount the information to be pushed, the user's workload can be reduced and the user's service experience can be improved. Furthermore, the effective rate of pushing information on each page is predicted, so as to obtain the page for mounting the information to be pushed according to the effective rate, which can increase the exposure rate of the information to be pushed.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A method for pushing information, comprising:
obtaining a plurality of initial pages containing document content;
predicting, based on the document content in the plurality of initial pages, an effective rate for pushing information using each initial page;
selecting, based on the effective rate, at least one candidate page from the plurality of initial pages and extracting a first keyword from the document content of each candidate page; and
determining a target page for mounting information to be pushed from the at least one candidate page, based on a matching degree between a second keyword of the information to be pushed and the first keyword.

2. The method according to claim 1, wherein predicting, based on the document content in the plurality of initial pages, the effective rate for pushing information using each initial page comprises:
   extracting feature information of the document content of each initial page; and
   for each initial page, obtaining the effective rate output by a trained recognition model by inputting the feature information into the trained recognition model, wherein a correspondence between the feature information and the effective rate is learned by the trained recognition model.

3. The method according to claim 2, wherein the trained recognition model is obtained by:
   obtaining a sample page and monitoring a visit to the sample page;
   determining an actual visit effective rate based on a visit record obtained by the monitoring;
   obtaining a labeled sample page by labeling the sample page based on the actual visit effective rate; and
   training an initial recognition model based on the labeled sample page, until a difference between the effective rate as output by the trained recognition model and the actual visit effective rate is minimalized.

4. The method according to claim 1, wherein selecting the at least one candidate page from the plurality of initial pages based on the effective rate, comprises:
   determining the initial page whose effective rate is greater than a first threshold as one candidate page.

5. The method according to claim 4, after determining the target page for mounting the information to be pushed from the at least one candidate page, further comprising:
   monitoring a visit to the target page for mounting the information to be pushed; and
   increasing the first threshold in response to determining, based on a visit record obtained by the monitoring, that at least one indicator satisfies a predetermined condition.

6. The method according to claim 1, wherein determining the target page for mounting the information to be pushed from the at least one candidate page based on the matching degree between the second keyword of the information to be pushed and the first keyword, comprises:
   determining the candidate page whose matching degree is greater than a second threshold as the target page.

7. The method according to claim 6, after determining the target page for mounting the information to be pushed from the at least one candidate page, further comprising:
   monitoring a visit to the target page for mounting the information to be pushed; and
   increasing the second threshold in response to determining, based on a visit record obtained by the monitoring, that at least one indicator satisfies a predetermined condition.

8. The method according to claim 2, wherein extracting the first keyword from the document content of each candidate page, comprises:
   obtaining the first keyword corresponding to each candidate page by performing keyword extraction on the document content of each candidate page using the trained recognition model.

9. The method according to claim 1, before determining the target page for mounting the information to be pushed from the at least one candidate page based on the matching degree between the second keyword of the information to be pushed and the first keyword, further comprising:
   obtaining a keyword tag of the information to be pushed, wherein the keyword tag is configured in response to a user action; and
   determining the second keyword of the information to be pushed based on the keyword tag.

10. The method according to claim 1, before determining the target page for mounting the information to be pushed from the at least one candidate page based on the matching degree between the second keyword of the information to be pushed and the first keyword, further comprising:
    querying a correspondence between push information and keywords based on the information to be pushed, to determine target push information that matches the information to be pushed; and
    determining a keyword corresponding to the target push information as the second keyword of the information to be pushed.

11. A method for pushing information, comprising:
    sending a search request comprising a search keyword to a server;
    receiving request response information, wherein the request response information comprises a search result corresponding to the search keyword, the search result comprises a link to a target page, and the target page is obtained according to the method of claim 1;
    displaying the search result; and
    obtaining and displaying the target page in response to a triggering operation on the link to the target page in the search result.

12. An electronic device, comprising:
    at least one processor; and
    a memory communicatively connected with the at least one processor; wherein, the memory stores instructions executable by the at least one processor, and when the instructions are executed by the at least one processor, the at least one processor is caused to execute the method for pushing information comprising:
    obtaining a plurality of initial pages containing document content;
    predicting, based on the document content in the plurality of initial pages, an effective rate for pushing information using each initial page;
    selecting, based on the effective rate, at least one candidate page from the plurality of initial pages and extracting a first keyword from the document content of each candidate page; and
    determining a target page for mounting information to be pushed from the at least one candidate page, based on a matching degree between a second keyword of the information to be pushed and the first keyword.

13. The device according to claim 12, wherein predicting, based on the document content in the plurality of initial pages, the effective rate for pushing information using each initial page comprises:
    extracting feature information of the document content of each initial page; and
    for each initial page, obtaining the effective rate output by a trained recognition model by inputting the feature information into the trained recognition model, wherein a correspondence between the feature information and the effective rate is learned by the trained recognition model.

14. The device according to claim 13, wherein the trained recognition model is obtained by:

obtaining a sample page and monitoring a visit to the sample page;

determining an actual visit effective rate based on a visit record obtained by the monitoring;

obtaining a labeled sample page by labeling the sample page based on the actual visit effective rate; and training an initial recognition model based on the labeled sample page, until a difference between the effective rate as output by the trained recognition model and the actual visit effective rate is minimalized.

15. The device according to claim 12, wherein selecting the at least one candidate page from the plurality of initial pages based on the effective rate, comprises:

determining the initial page whose effective rate is greater than a first threshold as one candidate page.

16. The device according to claim 12, wherein determining the target page for mounting the information to be pushed from the at least one candidate page based on the matching degree between the second keyword of the information to be pushed and the first keyword, comprises:

determining the candidate page whose matching degree is greater than a second threshold as the target page.

17. The device according to claim 16, wherein the processor is further configured to:

monitor a visit to the target page for mounting the information to be pushed; and increase the second threshold in response to determining, based on a visit record obtained by the monitoring, that at least one indicator satisfies a predetermined condition.

18. The device according to claim 13, wherein extracting the first keyword from the document content of each candidate page, comprises:

obtaining the first keyword corresponding to each candidate page by performing keyword extraction on the document content of each candidate page using the trained recognition model.

19. The device according to claim 12, wherein the processor is further configured to:

obtain a keyword tag of the information to be pushed, wherein the keyword tag is configured in response to a user action; and determine the second keyword of the information to be pushed based on the keyword tag.

20. The device according to claim 12, wherein the processor is further configured to:

query a correspondence between push information and keywords based on the information to be pushed, to determine target push information that matches the information to be pushed; and determine a keyword corresponding to the target push information as the second keyword of the information to be pushed.

* * * * *